US006197736B1

United States Patent
Chang

(12) United States Patent
(10) Patent No.: US 6,197,736 B1
(45) Date of Patent: Mar. 6, 2001

(54) ALKALINE CLEANING SOLUTION

(75) Inventor: Cathleen H. Chang, Renton, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/464,937

(22) Filed: Dec. 16, 1999

Related U.S. Application Data

(60) Provisional application No. 60/113,330, filed on Dec. 22, 1998.

(51) Int. Cl.$^7$ .................................................. C02F 5/08
(52) U.S. Cl. .......................... 510/247; 134/184; 134/40; 29/81.01; 427/307; 427/327; 427/341
(58) Field of Search .................. 134/40, 60, 72, 134/184; 29/81.01; 427/307, 327, 341

(56) References Cited

U.S. PATENT DOCUMENTS

| 4,108,246 | 8/1978 | Jones | 166/312 |
|---|---|---|---|
| 4,155,857 | 5/1979 | Jones | 252/8.55 E |
| 4,199,624 * | 4/1980 | Smith | 427/309 |
| 4,279,768 | 7/1981 | Busch | 252/180 |
| 4,810,405 | 3/1989 | Waller et al. | 252/180 |
| 5,023,011 | 6/1991 | Busch et al. | 252/180 |
| 5,024,783 | 6/1991 | Busch et al. | 252/180 |
| 5,482,641 * | 1/1996 | Fleisher | 252/90 |
| 5,545,347 | 8/1996 | Ouyang et al. | 510/254 |
| 5,634,979 | 6/1997 | Carlson et al. | 134/3 |
| 5,786,313 * | 7/1998 | Schneider et al. | 510/219 |

OTHER PUBLICATIONS

The Orelube Corp., BOELUBE® "A Better Way"; Date printed from Web site: Dec. 13, 1999 (1 page).
The Orelube Corp., BOELUBE® "Data"; Date printed from Web site: Dec. 13, 1999 (2 pages).
The Orelube Corp., BOELUBE® Product List; Date printed from Web site: Dec. 13, 1999 (1 page).
The Orelube Corp., Material Safety Data Sheet, Product Name: BOELUBE® 70106; Date MSDS Prepared: Aug. 6, 1997 (2 pages).
*Hawley's Condensed Chemical Dictionary*, 11th ed. (1987), pp. 1033, 1034, and 1061.
Spectrum Chemical Mfg., Material Safety Data Sheet, Trade Name: Sodium Gluconate; Date MSDS Prepared: Feb. 12, 1991 (4 pages).
McGean–Rohco, Inc., Material Safety Data Sheet, Product Name: ROPREPP DERUSTER WT; Revision 3, Effective Date: May 1, 1997 (4 pages).

* cited by examiner

*Primary Examiner*—Yogendra Gupta
*Assistant Examiner*—D G Hamlin
(74) *Attorney, Agent, or Firm*—Paul C. Cullom, Jr.

(57) ABSTRACT

An improved alkaline cleaning solution that has the ability to descale, derust, and completely dissolve machining lubricants coated on steel and other iron alloy objects, the alkaline cleaning solution consisting essentially of: (a) water; (b) about 10% to 95% by volume of a water-soluble descaling and derusting agent; and (c) about 2% to 8% by weight of a water-soluble sequestering agent selected from the group consisting of sodium gluconate and its functional equivalents. A process for descaling, derusting, and completely dissolving and removing machining lubricants coated on steel and other iron alloy objects, the process comprising the steps of: (a) providing an alkaline cleaning solution consisting essentially of water, about 10% to 95% by volume of a water-soluble descaling and derusting agent, and about 2% to 8% by weight of a water-soluble sequestering agent selected from the group consisting of sodium gluconate and its functional equivalents; and (b) contacting the object with the alkaline cleaning solution at a temperature of about 120° F. to 140° F. for about 15 to 35 minutes, whereby the object is descaled, derusted, and the machining lubricant is completely dissolved and removed.

4 Claims, No Drawings

ALKALINE CLEANING SOLUTION

CROSS-REFERENCE TO RELATED APPLICATIONS

This application claims the benefit of U.S. Provisional Application No. 60/113,330 filed Dec. 22, 1998 entitled Improved Alkaline Cleaner.

BACKGROUND OF THE INVENTION

This invention is in the field of water-base alkaline cleaning solutions that are used to descale and derust objects made of steel and other iron alloys. The object that needs to be descaled and derusted, for example a drill bit, may be contaminated with a water-insoluble machining lubricant and a smut consisting generally of machining lubricant and small metal particles congealed together. Conventional water-base alkaline cleaning solutions do not have the ability to completely dissolve machining lubricants. The present invention has this ability.

An example of a widely used water-based alkaline cleaning agent is a product manufactured by McGean-Rohco, Inc., of Livonia, Mich. 48150, and sold under the trademark ROPREPP® DERUSTER WT. This product, ROPREPP® DERUSTER WT, is a liquid deruster concentrate containing surfactants, complexing agents, and 25–30 wt. % sodium hydroxide. Consequently, it has a pH that is strongly basic. It is used to derust and descale objects made of steel and other iron alloys. Further information about the composition of ROPREPP® DERUSTER WT may be found in its Material Safety Data Sheet (MSDS No. 13075, revision 3, of May 1, 1997) which is incorporated by reference herein.

An example of a widely used water-insoluble machining lubricant is a machining lubricant manufactured by The Orelube Corporation, of Plainview, N.Y. 11803, and sold under the trademark BOELUBE® 70106. This product, BOELUBE® 70106, is a long chain alcohol-base machining lubricant, which is a free flowing, water-insoluble liquid at room temperature. Further information about the composition of BOELUBE® 70106 may be found in its Material Safety Data Sheet of Aug. 6, 1997 which is incorporated by reference herein.

BRIEF SUMMARY OF THE INVENTION

In one aspect the invention is an improved alkaline cleaning solution that has the ability to descale, derust, and completely dissolve machining lubricants coated on steel and other iron alloy objects, the alkaline cleaning solution consisting essentially of: (a) water; (b) about 10% to 95% by volume of a water-soluble descaling and derusting agent; and (c) about 2% to 8% by weight of a water-soluble sequestering agent selected from the group consisting of sodium gluconate and its functional equivalents.

In another aspect the invention is a process for descaling, derusting, and completely dissolving and removing machining lubricants coated on steel and other iron alloy objects, the process comprising the steps of: (a) providing an alkaline cleaning solution consisting essentially of water, about 10% to 95% by volume of a water-soluble descaling and derusting agent, and about 2% to 8% by weight of a water-soluble sequestering agent selected from the group consisting of sodium gluconate and its functional equivalents; and (b) contacting the object with the alkaline cleaning solution at a temperature of about 120° F. to 140° F. for about 15 to 35 minutes, whereby the object is descaled, derusted, and the machining lubricant is completely dissolved and removed.

DETAILED DESCRIPTION OF THE INVENTION

The present invention is an improved water-base alkaline cleaning solution that will completely dissolve and remove a water-insoluble machining lubricant, such as BOELUBE® 70106 (hereafter referred to as "BOELUBE®"), from objects made of steel and other iron alloys, for example, steel drill bits that have been used in drilling and that have become contaminated with machining lubricant and a smut generally consisting of machining lubricant and small metal particles congealed together. Complete solubilization of the machining lubricant is achieved by adding a water-soluble sequestering agent, such as sodium gluconate or its functional equivalent, to the water-based alkaline cleaning bath containing a commercially available descaling and derusting agent, such as ROPREPP® DERUSTER WT. The present improved alkaline cleaning solution invention can also be used on other tools (such as reamers, saws, broachers, grinders, taps, millers, thread cutters, deburrers, punches) that have become coated with machining lubricant and smut.

Prior to this invention, no water-based alkaline cleaning agent was known that would completely dissolve the water-insoluble machining lubricant. The water-based descaling and derusting agent ROPREPP® DERUSTER WT itself contains one or more surfactants that will dissolve machining lubricants better than most other alkaline cleaning agents. But by adding the sequestering agent to the solution of ROPREPP® DERUSTER WT, the machining lubricant, such as BOELUBE®, is dissolved and removed completely.

The metal build-up and dust from mechanical operations results in metal ions in the alkaline cleaning solution. The metal ions (such as aluminum ions) must be tied up to prevent them from interfering with the cleaning and to prevent redeposition on the object to be cleaned. The sequestering agent (such as sodium gluconate) keeps the metal ions soluble and away from the object to be cleaned.

There are numerous other commercially available alkaline cleaning agents intended to remove common oil and smut on metals. But they were unsuccessful in completely removing the machining lubricant BOELUBE® and the smut generally consisting of the machining lubricant and small metal particles congealed together. The improved alkaline cleaning solution of this invention will completely dissolve and remove the machining lubricant BOELUBE® and the smut.

The improved alkaline cleaning solution of the present invention is a water-based mixture of a descaling and derusting agent and a sequestering agent. The preferred descaling and derusting agent is the commercially available product ROPREPP® DERUSTER WT. The concentration of the descaling and derusting agent may vary between about 10% by volume to 95% by volume. The preferred concentration of the descaling and derusting agent is 30% by volume.

The preferred sequestering agent is sodium gluconate. The concentration of the sequestering agent may vary between about 2% by weight to 8% by weight. The preferred concentration of the sequestering agent is 5% by weight. The object to be cleaned should be in contact with the alkaline cleaning solution for about 15 to 35 minutes at a temperature of about 120° F. to 140° F., whereby the object is descaled, derusted, and the machining lubricant is completely dissolved and removed

EXAMPLE

Testing has been carried out to demonstrate that the present improved alkaline cleaning solution is effective at completely dissolving the widely-used machining lubricant BOELUBE® and the smut generally consisting of the machining lubricant and small metal particles congealed together on steel drill bits. The testing was performed in an alkaline cleaning tank. The improved alkaline cleaner was prepared by adding 5% by weight sodium gluconate (technical grade) in solid form to a tank containing 30% by volume of the descaling and derusting agent ROPREPP® DERUSTER WT.

The improved alkaline cleaning solution was prepared and operated as follows:

1. Tanks: Tanks and associated equipment must be fabricated from stainless steel.
2. Charging The Alkaline Cleaning Tank (for example, a 530 gallon tank): To have a 30% by volume concentration of ROPREPP® DERUSTER WT, charge the tank with 200 gallons of cool clean water, start the mechanical agitation, and then slowly add 159 gallons of the product ROPREPP® DERUSTER WT to the agitated tank. Then add 221 lbs. of sodium gluconate (technical grade) to the solution. Then add 171 gallons of cool clean water to achieve the operating level (530 gallons). This results in the preferred 5% by weight concentration of sodium gluconate.
3. Processing At The Alkaline Cleaning Tank: Maintain tank at 130° F. Immerse the contaminated drill bits completely for 24 minutes with mechanical agitation of the basket containing the drill bits for maximum contact with the improved alkaline cleaning solution.
4. Processing At The Dirty Rinse Water Tank (a 120-gallon tank): The dirty rinse water is at room temperature. Immerse the drill bits completely for 6 minutes with mechanical agitation of the basket containing the drill bits for maximum contact with the rinse water.
5. Charging The Clean Rinse Water Tank (a 130 gallon tank): To have 1.0% by volume of TURCO® RUST BLOC (the trademark for a rust inhibitor sold by Turco Products, Inc., of Westminster, Calif. 92654), charge tank with 129 gallons of cool clean water. Start the mechanical agitation and then slowly add 1.3 gallons of TURCO RUST BLOC to the agitated water.
6. Processing At the Clean Rinse Water Tank: Maintain tank at 170° F. Immerse drills completely for 6 minutes with mechanical agitation of the basket containing the drill bits for maximum contact with the rinse water. The drill bits are now removed and dried by conventional methods.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process for descaling, derusting, and completely dissolving and removing machining lubricants coated on steel and other iron alloy objects, said process comprising the steps of:

(a) providing an alkaline cleaning solution consisting essentially of water, about 10% to 95% by volume of the water-soluble descaling and a liquid deruster concentrate containing surfactants, complexors and 25.0–30.0% sodium hydroxide, and about 2% to 8% by weight of a water-soluble sequestering agent selected from the group consisting of sodium gluconate and its functional equivalents; and (b) contacting said object with said alkaline cleaning solution for about 15 to 35 minutes at a temperature of about 120° F. to 140° F., whereby said object is descaled, derusted, and said machining lubricant is completely dissolved and removed.

2. The process of claim 1 wherein said water-soluble sequestering agent is sodium gluconate.

3. A process for descaling, derusting, and completely dissolving and removing a machining lubricant coated on a drill bit, said process comprising the steps of:

(a) charging a tank with cool clean water, starting the mechanical agitation, and slowly adding about 10% to 95% by volume of the water-soluble descaling and a liquid deruster concentrate containing surfactants, complexors and 25.0–30.0% sodium hydroxide to said agitating water;

(b) adding about 2% to 8% by weight of a water-soluble sequestering agent selected from the group consisting of sodium gluconate and its functional equivalents to said agitating water solution;

(c) immersing said drill bit for about 15 to 35 minutes in said agitating water solution at a temperature of about 120° F. to 140° F., whereby said drill bit is descaled, derusted, and said machining lubricant is completely dissolved and removed; and (d) rinsing said drill bit in clean water.

4. The process of claim 3 wherein said water-soluble sequestering agent is sodium gluconate.

* * * * *